May 27, 1941.  H. L. BLOOD  2,243,147

OFFSETTING ARRANGEMENT FOR BORING TOOLS AND THE LIKE

Filed June 26, 1939

Inventor:
Harold L. Blood
By Geo. H. Kennedy Jr.
Attorney

Patented May 27, 1941

2,243,147

UNITED STATES PATENT OFFICE 2,243,147

OFFSETTING ARRANGEMENT FOR BORING TOOLS AND THE LIKE

Harold L. Blood, Worcester, Mass., assignor to The Heald Machine Company, Worcester, Mass., a corporation of Massachusetts Application June 26, 1939, Serial No. 281,195

7 Claims. (Cl. 77—3)

The present invention relates to an arrangement by which a rotary tool-carrying spindle, such as used in boring, grinding and like operations may be offset slightly at the conclusion of such operation, so that upon withdrawal of the tool from the workpiece bore, the tool will be radially spaced from the finished surface of said bore and will leave no mark or scratch thereon.

In my co-pending companion application, Serial 163,983, filed Sept. 15, 1937, now Patent No. 2,220,779, dated November 5, 1940, the desired lateral offsetting of the tool occurs in response to a short endwise shifting of the spindle, said lateral movement being permitted by the looseness or play afforded by the rocking shoe bearings for said spindle when the latter has ceased its rotation.

The present invention utilizes a similar short endwise shifting movement of the spindle, but such movement in this case does not directly produce the desired offset; that is to say, the arrangement here is such that this endwise shifting of the spindle frees the latter from the radial restraint imposed normally by the spindle bearings, thus permitting said spindle to be shifted sidewise by a spring or other equivalent device which is normally inoperative.

Other and further objects and advantages of the invention will more fully appear from the following detailed description taken in connection with the accompanying drawing in which—

Like reference characters refer to like parts in the different figures.

Figure 1:
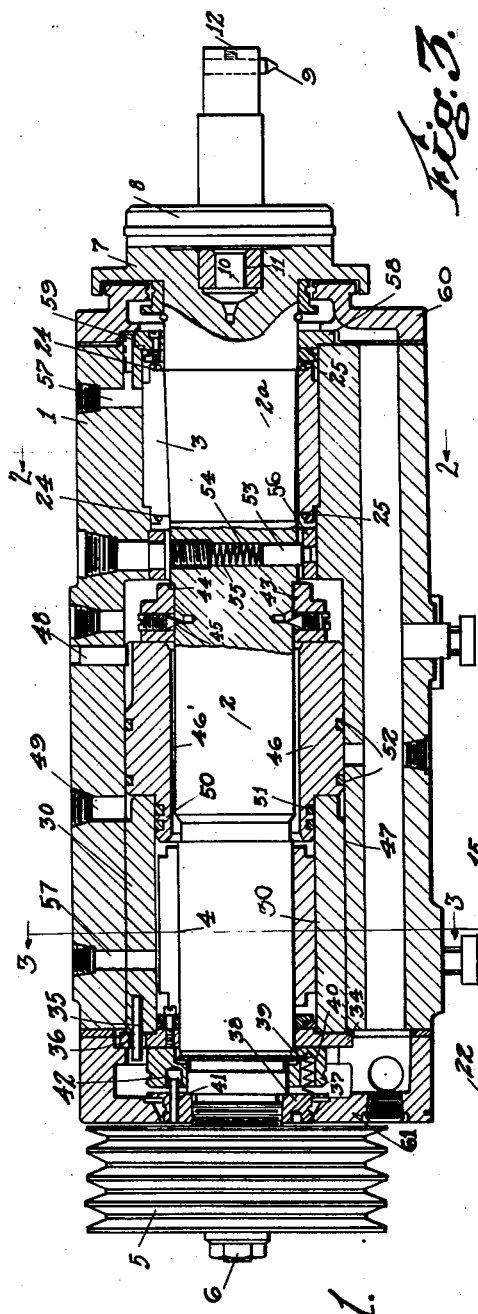
Fig. 1 is a sectional view through a tool head embodying the invention.

The boring head shown, as one embodiment of the invention, is intended for use on any of the familiar types of cutting machines which incorporate a rotary spindle for supporting either the cutting tool or the workpiece. One example of a boring machine to which the head shown is particularly applicable is disclosed in the Schmidt Patent No. 2,058,359. In machines of this character the base has a reciprocable table thereon on which either the workpiece to be bored, or the boring head, is mounted, the other of these elements being positioned on a bridge secured to the base of the machine at one end of the table.

Movement of the table procures a relative axial movement between the workpiece and the boring spindle for a boring operation on the workpiece while the table is moving in one direction, and a retraction of the spindle from within the workpiece bore when the table is moving in the opposite direction. Prior to reversal of the table movement, and after the boring tool has completed its action on the workpiece, the rotating boring spindle is stopped and the mechanism shown in the drawing is rendered operative to procure an offsetting movement between the tool and the finished surface of the workpiece. The mechanism for stopping the spindle rotation is fully described in the Schmidt patent above referred to, and as any mechanism of this character may be utilized in connection with the present invention, such a mechanism need not be described in detail.

Referring to the drawing, my improved boring head has a housing 1 in which a spindle 2 is journalled, preferably in suitable axially spaced bearings 3 and 4, hereinafter described in detail. The spindle has a pulley 5 at one end thereof suitably secured to the spindle for rotation therewith, as by a clamping nut 6, a driving connection being provided for the spindle by suitable V-belts. The other end of the spindle has a face plate 7 integral therewith, and a quill 8, carrying the boring tool 9, is mounted on the face plate, being located accurately by a stud 10 on the quill extending into a bore 11 in the end of the spindle. The boring tool 9 is mounted in the end of the quill and is held in position by a clamping screw 12.

Figure 2:
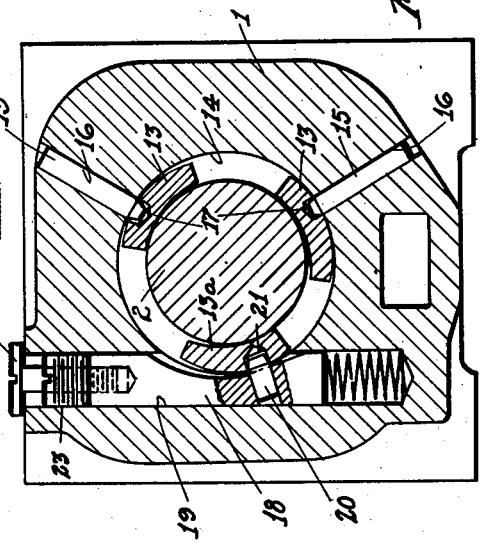
Fig. 2 is a sectional view along the line 2—2 of Fig. 1.

According to my invention, the spindle bearing which is nearest to the tool 9, that is the bearing 3 of Fig. 1, is internally tapered from end to end, and the spindle 2, at the portion thereof engaged by said bearing 3 is correspondingly tapered, as shown at 2a. Consequently, when said spindle 2, in the manner hereinafter described, is shifted to the right, Fig. 1, said spindle is immediately deprived of the radial restraining influence of said tapered bearing 3, and is left free to be deflected radially or laterally from the position which it occupies when its tapered surface 2a is in contact with said bearing 3. The latter obviously, for purposes of my invention, could be provided in the form of a plain internally tapered sleeve surrounding the tapered portion 2a of the spindle, but I have here shown said bearing 3 in the form of a rocking shoe bearing, such as shown in Fig. 2, comprises a plurality of rocking shoes 13 and 13a having their inner surfaces curved on a slightly greater radius of curvature than the radius of curvature of the periphery of the spindle 2. The outer surface of each shoe has a slightly smaller radius of curvature than the radius of curvature of the bore 14 in which the shoes are positioned. Each of the shoes 13 is held in position by a locating pin 15 positioned in a bore 16 in the housing 1, with the inner end of the pin engaging in a recess 17 in the outer surface of the shoe.

The other shoe 13a of this bearing is adjustable within the housing by means of a plunger 18 located in a bore 19 in the housing. A pin 20 corresponding to the pins 15 is carried by the plunger and engages in a recess 21 in the rocking shoe 13a. The plunger is cut away to allow the bearing to assume the proper position in relation to the spindle. A screw 22 extends through a threaded plug 23 in the bore 19 and holds the plunger 18 against the inner end of the plug 23, thereby definitely locating the rocking shoe 13a within the housing.

The inner surfaces of the several rockable shoes 13 and 13a have the same taper longitudinally as the spindle portion 2a in order to assure, in the normal position of the spindle, a contact between the shoes and the spindle throughout the length of the tapered portion 2a. Expansible rings 24 are positioned at opposite ends of the rocking shoes and engage in notches 25 therein so that the shoes are resiliently held against the surface of the bore 14 at all times.

Figure 3:
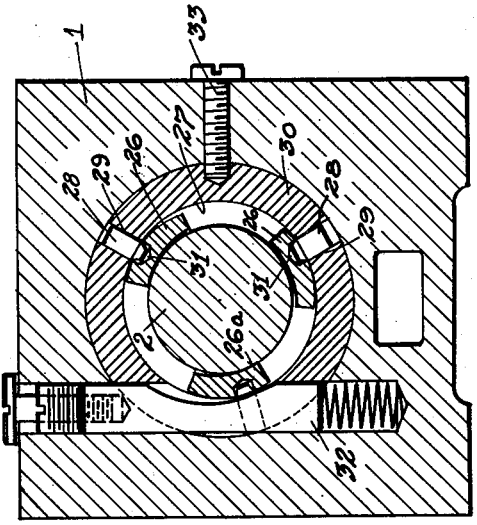
Fig. 3 is a sectional view along the line 3—3 of Fig. 1.

The other spindle bearing 4, remote from tool 9, is preferably of rocking shoe type, in order to afford, when said spindle is at rest, the slight play or looseness between said spindle and said bearing required by the greater lateral offsetting movement which, as hereinafter described, is imparted to said spindle at its other end. As shown in Fig. 3, the bearing 4 comprises rocking shoes 26 and 26a having their inner surfaces curved on a slightly greater radius of curvature than the radius of curvature of the periphery of the spindle 2. The outer surface of each shoe has a slightly smaller radius of curvature than that of the bore 27 of the sleeve 30 in which the shoes are positioned. Each of the shoes 26 is held in position by a locating pin 28 positioned in a small bore 29 in the sleeve 30 within the housing, with the inner end of the pin engaging in a recess 31 in the outer surface of the shoe.

The other shoe 26a is adjustable within the housing by means of a plunger 32 corresponding in all respects to the plunger 18, the position of which is controlled in the same manner. From Fig. 3 it will be apparent that the sleeve 30, which carries the rocking shoes 26, is held against endwise movement in the housing bore 47 by a locking bolt 33.

Adjacent the end of the spindle on which the pulley is mounted is a cap 34 which surrounds the spindle and engages the end of the sleeve 30. This cap is held against rotation by a pin 35 projecting from the sleeve 30 and extending through an opening 36 in the cap. A collar 37 surrounds the shaft on the outside of the cap and is slidable on the shaft. Outside of the collar is a ring 38 which is threaded on the spindle. Coil springs 39 positioned in recesses 40 in the collar 37 engage with the side of the ring, thereby urging the spindle as a whole toward the left, Fig. 1. A pin 41 positioned in the ring 38 and engaging in a recess 42 in the collar 37 assures a rotation of the collar and ring in unison.

The spindle is shifted axially to free the spindle within the bearing 3, thereby making possible a slight lateral movement of the tool end of the spindle for procuring the radial retraction of the tool. For obtaining this axial movement of the spindle, the latter has mounted thereon a collar 43, clamped against a shoulder 44 on the spindle by screws 45, the inner ends of which are substantially conical, as shown. A piston 46 is positioned in the same bore 47 in the housing in which sleeve 30 is located and the piston is held against rotation by a key 48. The end of the piston engages the collar 43, as shown, and when fluid under pressure is directed through an opening 49 in the housing at the left hand end of the piston, the fluid pressure causes the piston to move to the right and to carry therewith the spindle. This axial movement is possible by reason of the springs 39, above referred to.

The piston 46 is hollow and has an opening 46' therethrough large enough to allow the spindle to pass therethrough without engaging the piston. The right hand end of the piston has a cylindrical flange 50 which engages the inner surface of the sleeve 30 which surrounds the bearing 4, and suitable piston rings 51 and 52 are provided for preventing leakage of the fluid under pressure.

The axial movement of the spindle frees the tool end of the spindle, as above stated, and makes possible a slight radial shifting movement of the spindle within the bearings 3. This radial movement is procured by a plunger 53 radially slidable in a diametrical bore 54 in the spindle. A spring 55 urges the plunger outwardly of the spindle and the outer end of the plunger engages a sleeve 56 rotatable in the housing and engaging with a cylindrical surface thereof. As shown, the plunger 53 extends approximately parallel to the radial position of the boring tool in the end of the spindle and projects from the spindle on the same side as the boring tool, so that when the lateral shifting movement of the spindle occurs, the effect will be a radial retraction of the boring tool from operative boring position.

A supply of lubrication for the bearings is provided through a port 57 in the housing and escape of the fluid from the space surrounding the bearings is provided around the cap 34 which is held resiliently against the left hand end of the opening through the housing. A similar cap 58 is located at the right hand end of the opening within which the spindle is journalled, this cap being held against rotation by a pin 59 positioned in the housing and engageable with a notch in the edge of the cap. A cover plate 60 extends over the cap and clamps it against the end of the housing, the cover plate being held in position by suitable bolts, not shown. A similar cover plate 61 is located at the left hand end of the toolhead.

Boring heads of the character above described are generally mounted on boring machines in which the tool is fed axially relative to the workpiece at a relatively slow rate to perform the boring operation and after the tool has passed entirely over the surface to be bored, the tool is withdrawn axially from the workpiece. The reciprocatory table by which the relative movement between the tool and work is obtained is frequently actuated by fluid under pressure, and the means for shifting the spindle axially within the housing may be connected to the fluid pressure system which actuates the table so that upon reversal of the table movement the spindle will be automatically shifted axially for a retraction of the tool. Such an arrangement is not essential, however, and it may be desirable to provide other valve means, either manually or automatically controlled, for directing fluid under pressure to the spindle shifting means at the predetermined point in the machine operation. It will be understood that the fluid under pressure utilized for shifting the spindle axially is under a higher pressure than the fluid utilized for lubrication, so that the latter will not interfere with the functioning of the spindle shifting means.

From the foregoing it will be apparent that the endwise or axial shifting movement within the housing frees the spindle from the centralizing action of the tapered bearing 3 and provides for a substantial amount of play between the spindle and this set of bearings. By this arrangement it is possible to obtain enough freedom of lateral movement for the spindle so that the spring 55 can then shift the tool end of the spindle laterally within the bearing 3 enough to provide for the desired amount of tool retraction.

The copending application of Blood and Anderson, Serial 280,761, filed June 23, 1939, covers an invention prior in date to that of the present application; by said Blood and Anderson invention, endwise movement of a boring tool spindle is utilized to free said spindle from the holding action of its bearings, thus to permit the boring tool to be retracted at the end of the boring operation. For this purpose, the spindle of said Blood and Anderson application has a high-angle contact ball bearing, whereon the normal axial pre-load is relieved in order to give the spindle the desired lateral play. The present application is directed specifically to a spindle supported by a tapered bearing at the end nearest the tool, and the invention provides for relieving the spindle of the holding action of the tapered bearing by an endwise movement of the spindle within the housing.

I claim:

1. In a device of the class described, a housing, a spindle journalled therein, bearings for said spindle, at least one of said bearings being tapered and engageable with a tapered portion of the spindle, means for shifting the spindle axially of the housing to free the spindle from the holding action of the tapered bearing, and means for shifting the spindle laterally of the housing.

2. In apparatus of the class described, means for supporting a workpiece, a cutting tool for operation on said workpiece, a rotary spindle carrying one of said elements, a housing in which said spindle is journalled, spaced bearings at opposite ends of said housing for said spindle, one of said bearings being tapered and normally contacting a correspondingly tapered portion of said spindle, and the other bearing comprising a plurality of rockable shoes, means operable at the end of a tooling operation for shifting said spindle axially, to free same from the holding action of said tapered bearing, and spring means rendered operative by said freeing for displacing said spindle laterally, to offset said tool from the workpiece surface.

3. In apparatus of the class described, a housing, a rotary spindle journalled in said housing and projecting from one end thereof, a boring tool on the projecting end of said spindle, bearings for said spindle at the opposite ends of said housing, one of said bearings being tapered and normally contacting a correspondingly tapered portion of said spindle, spring means thrusting laterally on said spindle adjacent said tapered bearing, and means brought into action at the end of a boring operation for shifting said spindle axially, thereby to free it from the holding action of said tapered bearing and to render said spring means effective for displacing said spindle laterally to offset its tool from the bored surface.

4. In apparatus of the class described, a housing, a rotary spindle journalled in said housing and projecting from one end thereof, a boring tool on the projecting end of said spindle, bearings for said spindle at the opposite ends of said housing, one of said bearings being tapered and normally contacting a correspondingly tapered portion of said spindle, spring means thrusting laterally on said spindle adjacent said tapered bearing, in a direction substantially opposite to the projection of said tool from said spindle, and means brought into action at the end of a boring operation for shifting said spindle axially, thereby to free it from the holding action of said tapered bearing and to render said spring means effective for displacing said spindle laterally to offset its tool from the bored surface.

5. In apparatus of the class described, means for supporting a workpiece, a cutting tool for operation on said workpiece, a rotary spindle carrying one of said elements, a housing in which said spindle is journalled, spaced bearings at opposite ends of said housing for said spindle, the bearing nearest said tool being tapered and normally contacting a correspondingly tapered portion of said spindle, means thrusting laterally on said spindle adjacent said tapered bearing, and means brought into action at the end of said tool's operation for shifting said spindle endwise to free it from the holding action of said tapered bearing, thereby rendering said thrust means effective to displace said spindle laterally and to offset said tool from the workpiece surface.

6. In apparatus of the class described, means for supporting a workpiece, a cutting tool for operation on said workpiece, a rotary spindle carrying one of said elements, a housing in which said spindle is journalled, spaced bearings at opposite ends of said housing for said spindle, the bearing nearest said tool being tapered and normally contacting a correspondingly tapered portion of said spindle, means thrusting laterally on said spindle adjacent said tapered bearing, and means brought into action at the end of said tool's operation for shifting said spindle endwise to free it from the holding action of said tapered bearing, thereby rendering said thrust means effective to displace said spindle laterally and to offset said tool from the workpiece surface, the other bearing for said spindle comprising a plurality of rockable shoes adapted to yield in response to said lateral spindle displacement.

7. In apparatus of the class described, a housing, a rotary spindle journalled in said housing and projetcing from one end thereof, a boring tool on the projecting end of said spindle, bearings for said spindle at the opposite ends of said housing, one of said bearings being tapered and normally contacting a correspondingly tapered portion of said spindle, spring means thrusting laterally on said spindle adjacent said tapered bearing, and means brought into action at the end of a boring operation for shifting said spindle axially, thereby to free it from the holding action of said tapered bearing and to render said spring means effective for displacing said spindle laterally to offset its tool from the bored surface, the other bearing for said spindle comprising a plurality of rockable shoes adapted to yield in response to said lateral spindle displacement.

HAROLD L. BLOOD.